US007359430B2

(12) United States Patent
McDonough et al.

(10) Patent No.: US 7,359,430 B2
(45) Date of Patent: Apr. 15, 2008

(54) CDMA MULTICODE CHANNEL PROCESSING

(75) Inventors: John G. McDonough, La Jolla, CA (US); Jane Wang, San Diego, CA (US); Yan Hui, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 747 days.

(21) Appl. No.: 10/156,355

(22) Filed: May 28, 2002

(65) Prior Publication Data

US 2003/0156627 A1 Aug. 21, 2003

Related U.S. Application Data

(60) Provisional application No. 60/357,895, filed on Feb. 19, 2002.

(51) Int. Cl.
 *H04B 1/00* (2006.01)
(52) U.S. Cl. ........................... 375/147; 375/142
(58) Field of Classification Search .......... 375/130, 375/140, 141, 142, 147, 148
 See application file for complete search history.

(56) References Cited

U.S. PATENT DOCUMENTS

| | | | |
|---|---|---|---|
| 5,784,293 A * | 7/1998 | Lipa | 708/410 |
| 6,222,875 B1 * | 4/2001 | Dahlman et al. | 375/130 |
| 6,317,413 B1 * | 11/2001 | Honkasalo | 370/209 |
| 6,377,607 B1 * | 4/2002 | Ling et al. | 375/130 |
| 2002/0154615 A1 * | 10/2002 | Hans et al. | 370/335 |
| 2003/0112855 A1 * | 6/2003 | Margulis et al. | 375/147 |

FOREIGN PATENT DOCUMENTS

WO    WO 2005004347 A1 *  1/2005

\* cited by examiner

*Primary Examiner*—David B. Lugo
(74) *Attorney, Agent, or Firm*—Ronald O. Neerings; Wade James Brady, III; Frederick J. Telecky, Jr.

(57) ABSTRACT

A demodulator such as a Fast Hadamard Transform (FHT) based demodulator is used to demodulate all channels in a code space with code length equal to the data channel code. Since the codes for overhead control channels are usually longer, the control channel data is only partially uncovered. Once the necessary further processing is performed and the information to fully uncover the control channels is available, the control channel data is fully demodulated. By only processing one partially uncovered secondary control channel, the present invention reduces the implementation complexity. A hardware implementation of the above method, requires fewer data processing operations, and reduces data processing delays, resulting in lower power consumption.

16 Claims, 3 Drawing Sheets

CDMA MULTICODE CHANNEL PROCESSING

This application claims priority under 35 USC 119(e)(1) of provisional application Ser. No. 60/357,895 filed Feb. 19, 2002.

FIELD OF THE INVENTION

The present invention relates generally to wireless communication systems and more particularly, to a method and apparatus for performing efficient Code Division Multiple Access (CDMA) multicode channel processing.

BACKGROUND OF THE INVENTION

In current Direct Sequence Spread-Spectrum (DSSS) high-speed data standards and proposals, multiple orthogonal code channels are used to achieve very high data rates. In these systems, user data is either Time Division Multiplexed (TDM) and/or Code Division Multiplexed (CDM) using multiple code channels. Due to the bursty nature of most data traffic, for example, Hyper Text Transfer Protocol (HTTP) traffic, overhead channels are usually used to direct the packet data traffic on the forward link (down link).

The mobile users to whom the data is scheduled for from the Base Transceiver System (BTS) will be directed to data traffic channels via these overhead channels, while the mobile users to whom there is no data scheduled, will cease decoding the data channels after decoding the overhead channels. This approach can efficiently make use of the orthogonal code space and reduce interference.

In general, there are two types of overhead channels in CDMA high-speed data systems, namely, common control channels and dedicated control channels. Common control channels, such as those used in the 1xEVDV (also referred to as CDMA 2000) specification have the advantage of saving available codes, but have the disadvantage of introducing higher interference because they are not efficiently power controlled. Overhead control channels are usually low speed and thus are usually spread by longer orthogonal codes to provide higher processing gain. The data channels are typically spread using shorter orthogonal codes due to the higher data rates used. When dedicated control channels are used together with multicode data traffic channels via CDM in the same time frame, demodulation and processing of the overhead control channels requires dedicated hardware (and/or software) other than hardware (and/or software) allocated for demodulation and processing of the data channels. Namely, one demodulator for each overhead control channel is required to implement some of these prior art systems.

Furthermore, mobile users can be directed to one of multiple secondary control channels by a primary control/pointer channel. Therefore, the receiver has to demodulate all possible secondary control channels, which results in even more hardware allocation requirements and the introduction of further processing delays (or increases in the real-time requirement if a software solution is used). Alternatively, the receiver has to generate and store all necessary codes (e.g., Walsh codes, short and long PN codes) and delay the demodulation of the secondary control channel until the primary control channels have been processed. Similarly, some of the data channel processing has to be delayed until all overhead channels are processed. Both of the previously mentioned alternatives significantly increase the implementation complexity, delay the demodulation of the data channels and also introduce further data channel processing delays.

FIG. 1 shows a partial block diagram of a prior art receiver for one-code channel. A typical prior art implementation for processing overhead control channels and multiple code data channels in a receiver is shown in FIG. 5. As shown, one demodulator is required for each control channel and data processing operations are performed on each control channel. For example, to implement one such prior art system, it would require a total of seven demodulators and seven overhead control channel data processing operations (e.g., one Dedicated Pointer Channel (DPTRCHs) and six Shared Control Channels (SHCCHs). One proposal for the 1xEVDV standard uses twenty-four Dedicated Pointer Channels (DPTRCH) and six Shared Control Channels (SHCCH). The pointer field in the DPTRCH directs the mobile unit to one of the six possible SHCCHs, and the SHCCH provides information, such as the Modulation and Coding Scheme (MCS) level, the Walsh code index, etc. for the receiver to decode the data channels. These two overhead channels are CDM with data traffic channels in the same time frame. Given the above, there exists a need in the art for a method and apparatus to process overhead control channels in a multiple code channel environment in a more efficient manner than has been accomplished by prior art techniques described above. For the case where one or multiple common control channels are used for demodulating the data channel, a similar requirement exists.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

Figure 1:
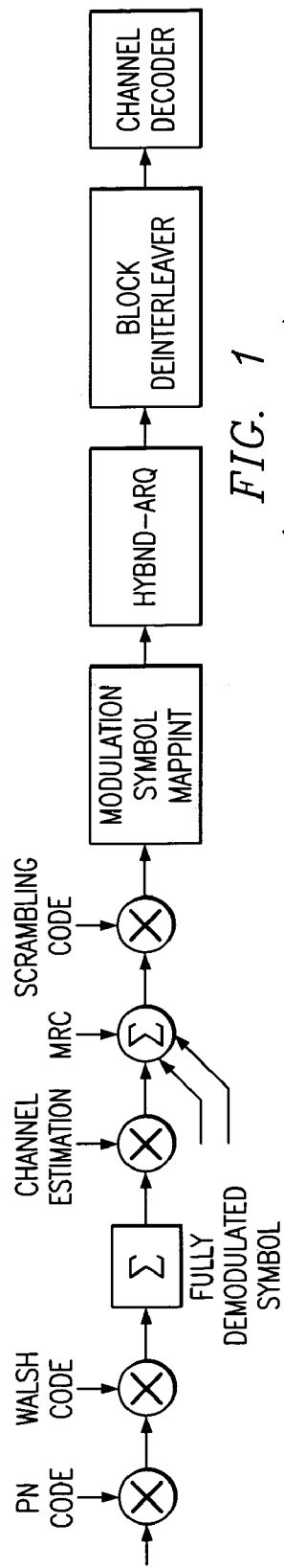
FIG. 1 is a partial block diagram of a prior art receiver for one code channel.

It should be appreciated that the particular implementations shown and described herein are illustrative of the invention and its best mode and are not intended to otherwise limit the scope of the invention in any way. While the specification concludes with claims defining the features of the invention that are regarded as novel, it is believed that the invention will be better understood from a consideration of the following description in conjunction with the drawing figures.

Since data traffic channels use multiple orthogonal codes, instead of demodulating each individual code channel separately using conventional methods, in accordance with the preferred embodiment of the invention, Fast Hadamard Transform (FHT) based methods are used to demodulate all code channels efficiently as will be described below.

Figure 2:
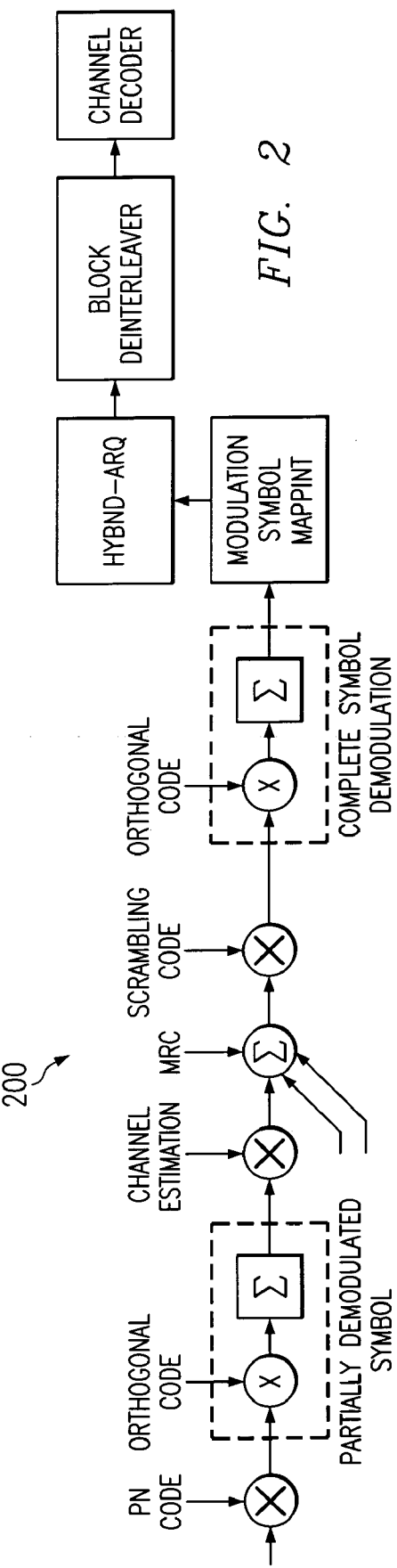
FIG. 2 is a partial block diagram of a receiver that performs partial processing in accordance with the invention.

Due to the property of an n-th order FHT, all of "n" results are conveniently available from the transformation. For example, for a Walsh code with length 16, a 16-th order FHT will give one demodulated symbol for each of 16 code channels, that covers all the code space for a length 16 Walsh code. To take advantage of this property, and considering that the orthogonal code allocated for overhead control channels should come from the code space that is not allocated for the data channels, the preferred embodiment uses a FHT based demodulator to demodulate all channels in the code space with a code length equal to the data channel code. It should be noted that although an FHT based demodulator is used in the preferred embodiment, any means of demodulating all of the codes will work with the present invention. Since the codes for overhead channels are usually longer due to their smaller payloads, the control channel data is only partially uncovered. However, this partially uncovered data can be further processed in the same way as data that is fully uncovered, including but not limited to deskewing, PN code descrambling, etc. Once the necessary processing has been done and the necessary information is available to fully uncover the control channels, the control channel data can then be fully demodulated, thus improving the processing efficiency. In FIG. 2 there is shown a block diagram illustrating this technique of first partially dispreading the overhead control channel.

Figure 3:
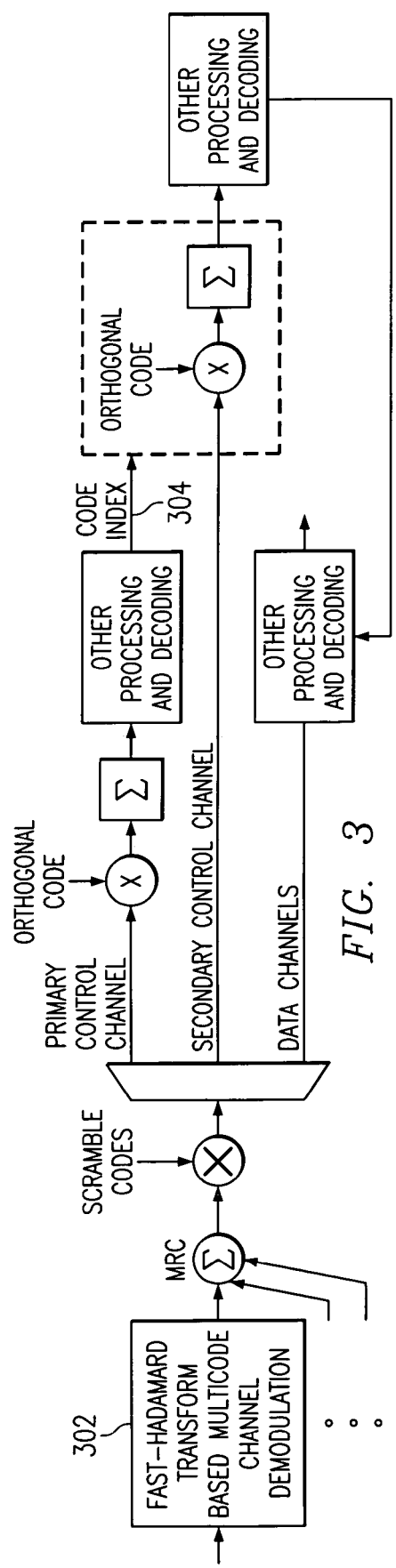
FIG. 3 shows a block diagram of a multicode channel processing circuit in accordance with one embodiment of the invention.

Referring now to FIG. 3, there is shown a block diagram that highlights an implementation of the present invention in a communication system. In this embodiment, a FHT based demodulator 302 is used to fully uncover all possible data channels. As a by-product, both (Primary and Secondary) overhead control channels are partially de-spread without introducing extra implementation complexity. Data channels, as well as both control channels, are deskewed, maximum-ratio combined, and long PN code de-scrambled in processing blocks that are common to all channels (only one channel is shown in FIG. 3). The primary control channel data is then fully despread and decoded to obtain the code index 304 for the secondary control channel. Then only one of the directed secondary control channels is fully despread and decoded before the information is extracted for decoding of the data channels.

Figure 4:
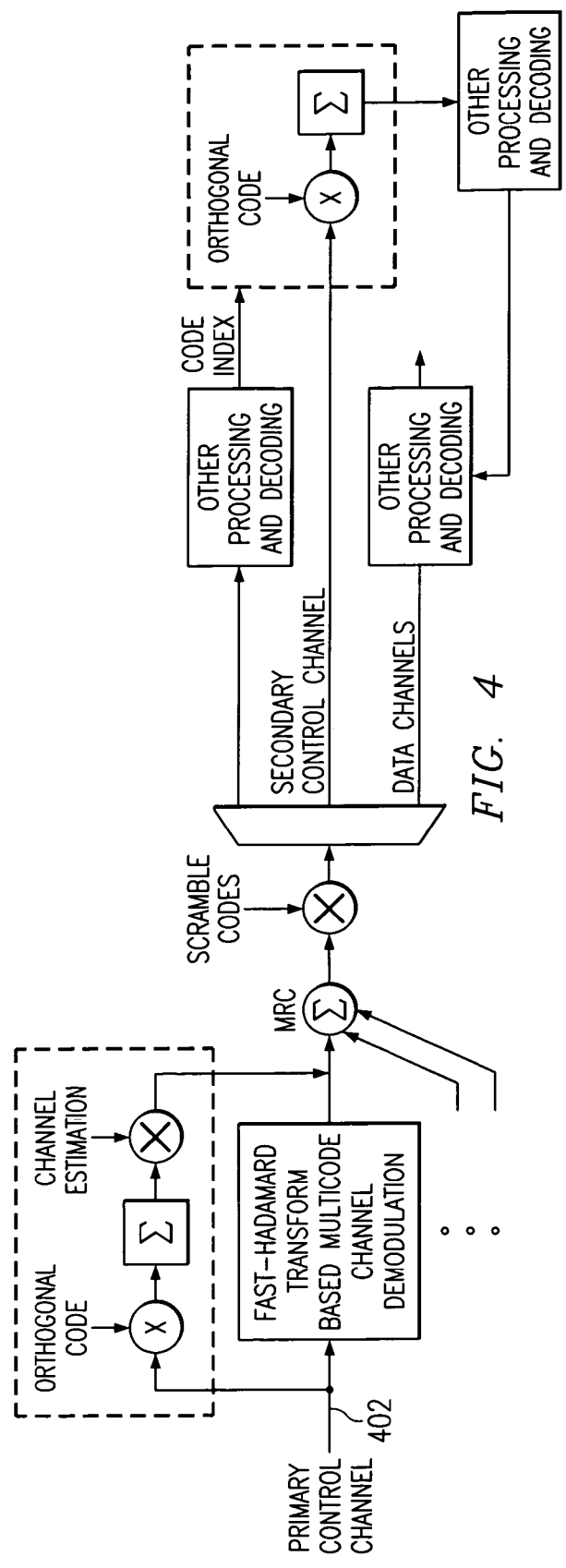
FIG. 4 shows a block diagram of a multicode channel processing circuit in accordance with an alternate embodiment of the invention.
Figure 5:
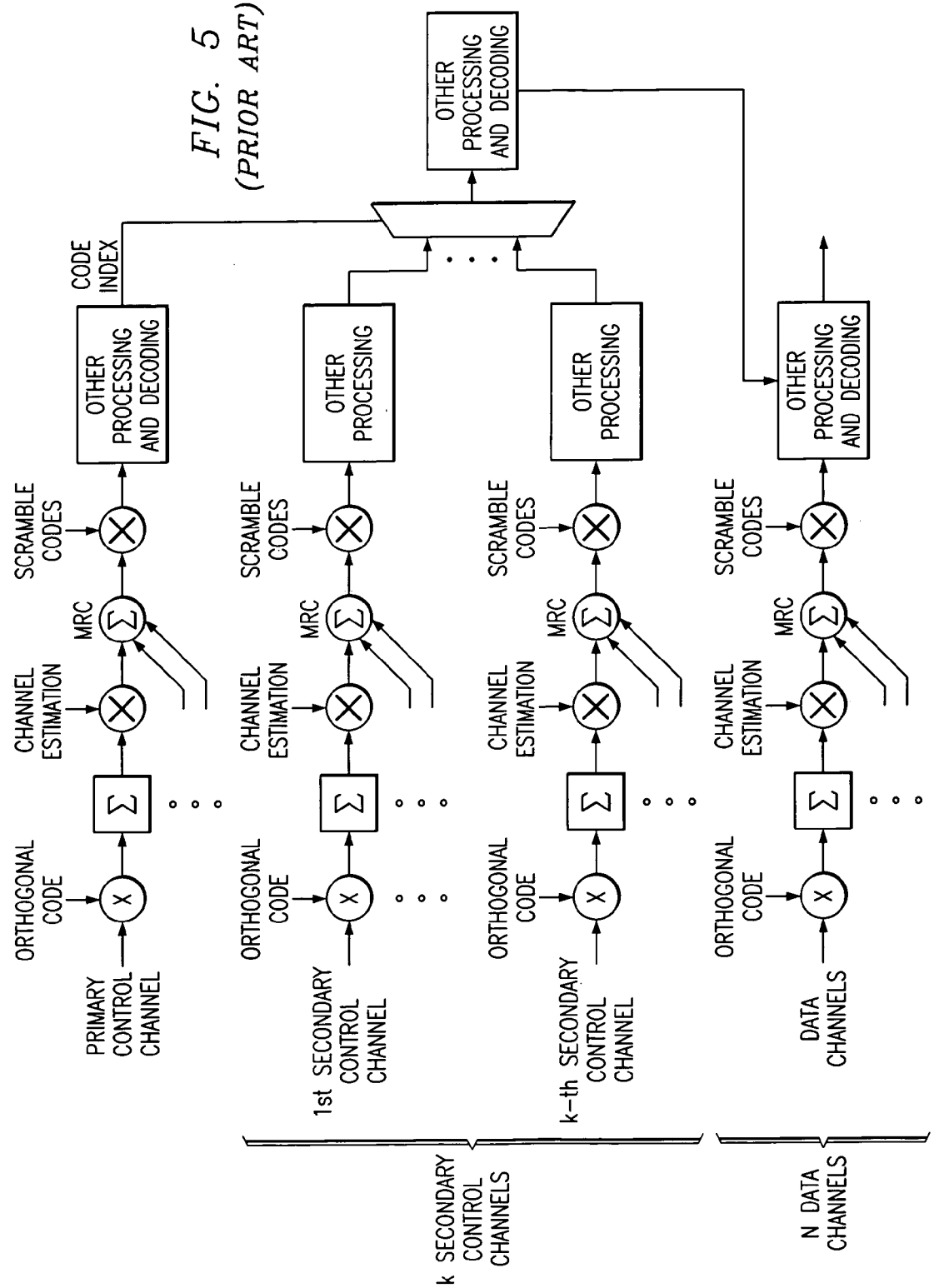
FIG. 5 shows a block diagram of a prior art multicode channel processing circuit.

In FIG. 4, another embodiment of the system is shown. In this implementation, the primary control channel information 402 is fully demodulated before being processed together with fully demodulated data channels and partially de-spread secondary control channels. The rest of the processing is the same as the previously described embodiment.

As illustrated in FIG. 3 and FIG. 4, the present invention requires no extra demodulator for partially dispreading the overhead channels. Also, instead of processing all possible fully despread secondary control channels, it only processes one partially despread secondary control channel. The present invention reduces the implementation complexity as compared to the previously described prior art approaches. In a hardware implementation, it performs fewer data processing operations, and minimizes data processing delay, which results in lower power consumption and lower cost.

As an illustrative example, assuming $R_i$ is a received chip level complex baseband signal, Ci is the complex short PN sequence, $W^N_n(i)$ is the Walsh code with length N and index n, and is the $S_i$ de-spread complex symbols. After being short PN despread, Walsh uncovered, de-skewed and maximum-ratio combined for different multipath and being long PN de-scrambled, the complex data symbol becomes $$S_k = (\Sigma_j w_j * (\Sigma_i (R_i * C'_i) * W^N_n(i))) * L_k, i=0\ldots I-1, j=0\ldots$$

where I is the number of chips per symbol, J is the number of multipath, $w_j$ are the weighting factors for MRC, and Lk are the long PN code symbols. Walsh codes with length N (where N is 2-th power) can be generated from $W^M_0$ (where M is less than $2^{log_2(N)-1}$) and Walsh code with length N/M when the original Walsh length is even. It can be generated from $W^M_1$ (where M is less than $2^{log_2(N)-1}$) and Walsh code with length N/M when the original Walsh length is odd. For example, $W^{512}_{2n}$ can be generated by $W^{16}_0$ and $W^{32}_n$, while $W^{256}_{2n+1}$ can be generated by $W^{16}_1$ and $W^{32}_n$. It should be noted that this observation can be extended to $W^M_n$ with any "n" rather than just n=0, 1. As a result, $S_k$ can be expressed as:

$$S_k = (\Sigma_j w_j * (\Sigma_i (R_i * C'_i) * W^N_n(i))) * L_k$$
$$= (\Sigma_j w_j * (\Sigma_q (\Sigma_p (R_p * C'_p) * W^M_m(p)) * W^{N/M}_n(q))) * L_k$$
$$= \Sigma_q ((\Sigma_j w_j * (\Sigma_p (R_p * C'_p) * W^M_m(p))) * L_k) * W^{N/M}_n(q),$$

where m is 0 for odd N and 1 for even N, n is (m−1)/2 for odd N and m/2 for even N.

In summary, the present invention helps to reduce implementation complexity by reducing the number of data processing operations required during channel processing thereby reducing the implementation costs and power consumption. The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention.

What is claimed is:

1. A method for multicode channel processing in a receiver operating in a spread spectrum communication system that transmits information using data and control channels, comprising
    initially demodulating received data and control channels in order to despread the channels in a code space with a code length equal to the data channel code, the data channels being fully uncovered and the control channels being partially uncovered; and
    waiting until all necessary information has been received in order to fully demodulate at least some of the control channels which were only partially uncovered in initially demodulating the received data and control channels, wherein codes for at least some of the control channels are longer in length than codes for the data channels, thereby causing the control channels to only be partially uncovered in initially demodulating the received data and control channels.

2. A method as defined in claim 1, where initially demodulating the received data and control channels is performed by a Fast Hadamard Transform (FHT) based demodulator.

3. A method as defined in claim 1, wherein the control channels comprise primary and secondary control channel and further comprising:

decoding fully the primary control channel data in order to obtain a code index for the secondary control channel.

4. A method as defined in claim 3, further comprising:
decoding fully only one of the partially uncovered secondary control channels before information is extracted to decode the data channels.

5. A method for multicode channel processing, comprising:
(a) demodulating information received on data and control channels to fully uncover the data channels and partially uncover the control channels; and
(b) fully uncovering one of the partially uncovered control channels, wherein the control channels comprise primary control channels and secondary control channels, and codes for at least some of the secondary control channels are longer in length than codes for the data channels, thereby causing the secondary control channels to only be partially uncovered when demodulating the information received on the data and control channels.

6. A method as defined in claim 5, wherein demodulating the information received on the data and control channels is performed by a Fast Hadamard Transform (FHT) based demodulator.

7. A method as defined in claim 5, further comprising:
(c) despreading fully only one of the secondary control channels in order to extract the required information to decode the data channels.

8. A method as defined in claim 5, further comprising:
(c) obtaining a code index for the secondary control channels from the fully uncovered primary control channels.

9. A method as defined in claim 8, further comprising:
(c) despreading and decoding one of the secondary control channels in order to extract the required information to decode the data channels.

10. A spread spectrum receiver that receives information on at least one data and one control channel, comprising:
a demodulator for despreading the information received on the at least one data and one control channel, the at least one data channel is fully uncovered and the at least one control channel is partially uncovered since the control channel codes are longer in length than the codes for the data channel; and
processing circuitry coupled to the demodulator for fully uncovering and decoding the at least one control channel.

11. A spread spectrum receiver as defined in claim 10, wherein the demodulator comprises a Fast Hadamard Transform (FHT) based demodulator.

12. A spread spectrum receiver as defined in claim 10, wherein that at least one control channel comprises at least one primary and at least one secondary control channel and the at least one primary control channel is used to obtain a code index for the secondary control channel.

13. A spread spectrum receiver as defined in claim 12, further comprising:
circuitry coupled to the processing circuitry for fully uncovering and decoding the secondary control channel in order to extract the necessary information to decode the data channel.

14. A method for multicode channel processing in a receiver operating in a spread spectrum communication system that transmits information using at least one data channel and one control channel, comprising:
(a) demodulating information received on the at least one data and the at least one control channel in order to fully uncover the at least one data channel and partially uncover the at least one control channel; and
(b) waiting until all necessary information has been received in order to fully uncover the at least one control channel, wherein the at least one control channel comprises primary control channels and secondary control channels, and codes for at least some of the secondary control channels are longer in length than codes for the at least one data channel, thereby causing the secondary control channels to only be partially uncovered when demodulating the information received on the data and control channels.

15. A method as defined in claim 14, further comprising:
uncovering fully and decoding at least one of the primary control channels in order to obtain a code index for use in uncovering the secondary control channels.

16. A method for multicode channel processing, comprising:
demodulating information received on data and control channels to fully uncover the data channel and partially uncover the control channels; and
subsequently fully uncovering at least one of the control channels that was partially uncovered, wherein a code for the at least one of the control channels is longer in length than codes for the data channels, thereby causing the at least one of the control channels to only be partially uncovered when demodulating the information received on the data and control channels.

* * * * *